United States Patent [19]

Wang

[11] 4,110,296

[45] Aug. 29, 1978

[54] FIRE RETARDANT ACRYLIC TERPOLYMER COMPOSITION AND FILMS THEREOF

[75] Inventor: Jin Liang Wang, Akron, Ohio

[73] Assignee: The Goodyear Tire & Rubber Company, Akron, Ohio

[21] Appl. No.: 751,935

[22] Filed: Dec. 17, 1976

[51] Int. Cl.$^2$ .................... C08K 3/16; C08K 3/32; C08K 5/49; C08F 120/00

[52] U.S. Cl. .................. 260/30.6 R; 260/45.7 P; 260/45.75 B; 260/45.75 W; 260/45.95 G; 526/292; 526/328.5

[58] Field of Search ............. 260/30.6 R, 45.7 P, 260/45.95 G, 45.75 B, 45.75 W

[56] References Cited

U.S. PATENT DOCUMENTS

| | | | |
|---|---|---|---|
| 2,949,432 | 8/1960 | Tarkington et al. | 260/30.6 R |
| 3,061,571 | 10/1962 | Heberling et al. | 260/30.6 R |
| 3,162,613 | 12/1964 | Touisenant | 260/30.6 R |
| 3,294,730 | 12/1966 | Jukes | 260/45.7 P |
| 3,300,423 | 1/1967 | Brown et al. | 260/30.6 R |
| 3,715,310 | 2/1973 | Butcher | 260/30.6 R |
| 3,817,913 | 6/1974 | Gaenzer et al. | 526/292 |
| 3,912,792 | 10/1975 | Tovval | 260/45.7 P |
| 3,929,688 | 12/1975 | Honig | 260/45.7 P |
| 3,954,908 | 5/1976 | Nakfimura et al. | 260/45.7 P |

*Primary Examiner*—Herbert J. Lilling
*Attorney, Agent, or Firm*—J. D. Wolfe

[57] ABSTRACT

Flame retardant acrylic terpolymer compositions comprise the reaction product of (1) an alkyl acrylate or alkyl methacrylate where the alkyl radical contains 1 to 16 carbon atoms, (2) vinyl nitrile, and (3) a halogenated monomer selected from the class consisting of vinylidene chloride, halogenated phenyl acrylate, halogenated phenyl methacrylate, compounded with a flame retardant plasticizer of triorgano phosphate, either alone or combined with decabromodiphenyl oxide or tris (β-chloroethyl) phosphate or the metal oxides of antimony and zinc.

4 Claims, No Drawings

FIRE RETARDANT ACRYLIC TERPOLYMER COMPOSITION AND FILMS THEREOF

This invention relates to novel fire retardant acrylic terpolymer compositions and films made from said composition. More particularly, this invention relates to plasticized acrylic terpolymer compositions suitable for making films that pass the NFPA701 vertical flame test with relatively low fire retardant additive loading.

The acrylate polymers and copolymer compositions have required compounding with very high loadings of fire retardant additive to pass the vertical flame test of Method NFPA701 but the high additive loadings have lowered the physical properties (tensile and modulus) of the compounded acrylate polymer or copolymer compositions. Therefore, their use in films or related products have not been widely accepted.

Unexpectedly, I have discovered that some of the acrylic terpolymers can be compounded with relatively small amounts (less than 35 percent by weight) of fire retardant additives and pass the NFPA701 vertical flame test and the resulting compounded acrylate terpolymers have good tensile strength and elongation and further exhibit good retention of physical properties after 300 hours Accelerometer aging. Thus, these compounded acrylate terpolymers yield films well suited for inflatable structures, packaging films, top coatings for floor tile and wall coverings and pond liners.

The flame retardant acrylic terpolymer compositions comprise an acrylic terpolymer of the monomers of Class A, B and C, usually about 20 to 60 parts of A, 10 to 40 parts of B and 20 to 70 parts of C and a fire retardant additive, usually as a plasticizer.

Representative monomers of Class A are the alkyl acrylate and alkyl methacrylates where the alkyl radical contains from 1 to about 16 carbon atoms, especially preferred alkyl radicals are methyl, ethyl, butyl and 2-ethylhexyl (2-EHA).

Representative monomers of Class B are acrylonitrile (AN), methacrylonitrile (MAN) and ethacrylonitrile.

Representative monomers of Class C are vinylidene chloride (also abbreviated as VDC), pentachlorophenyl methacrylate (also abbreviated PCMA), 2,4,6--tribromophenyl methacrylate (also abbreviated TBMA), as well as the halogenated phenyl acrylates and phenyl methacrylates containing about 20 to 70 and preferably 50 to 60 percent by weight of halogen such as chloride or bromide.

Representative fire retardant additives are the primary additives, the triorgano phosphates, sometimes called organo-phosphate esters, those called the complementary additives, and the metal oxides of zinc and antimony, and the halogenated hydrocarbons. The triorgano phosphates are grouped generally as aryl, alkyl-aryl, alkyl and cycloalkyl, where the aryl and cycloalkyl radical contains 6 to 10 carbon atoms and the alkyl radical contains 1 to 20 carbon atoms. The triorgano phosphates can be triaryl, trialkyl, tricycloalkyl or mixtures of these radicals. Representative radicals of these triorgano phosphates are triphenyl, tricresyl, xenyl, tritertbutylphenyl, tertamylphenyl and their homologues, or triterbutyl, tritertamyl, 2-ethylhexyl diphenyl, isodecyl diphenyl, tributyl, trioctyl, tributoxyethyl, tris(2,3-dichloropropyl) and tris(2,3-dibromopropyl). Mixed commercial grade triorgano phosphates are available as mixed triaryl phosphates, abbreviated as TAP, and isodecyl diphenyl phosphate, abbreviated as IDDPP. The complementary additives are represented by tris(betachloroethyl) phosphate, abbreviated as TBCEP, decabromodiphenyl oxide, hereinafter DBDPO. Distearyl pentaerythritol diphosphite, hereinafter called W-618 and a liquid tin maleate as a thermal stabilizer, hereinafter called F-837 are additives sometimes useful to stabilize the polymer to relatively high temperatures.

It has been found that the above compositions can be formed into films or other shapes having improved resistance to aging by incorporation of 0.5 to 4 parts, and preferably 1 to 2 parts of a light stabilizer such as 2-(2'-hydroxy-5'-methylphenyl) benzotriazole, called Tinuvin P, per 100 parts of acrylic terpolymer, together with 0.1 to 2.0 parts, and preferably 0.4 to 1 part of an antioxidant. Any of the usual antioxidants for ethylenic double bonds can be utilized, but the preferred ones are 2,6-ditertbutyl-4-methylphenol, called A.O. 26; 3,5-ditertbutyl-4-hydroxy-hydrocinnamic acid triester with 1,3,5-tris(2-hydroxyethyl)-S-triazine-2,4,6-(IH, 3H, 5H) trione, called A.O. 35; 2-(1-phenylethyl)-4-(1-phenylethylthio) phenol, also called A.O. 45, and 2,4,6-tris (3,5-ditertbutyl-4-hydroxybenzyl) mesitylene, hereinafter called A.O. 246.

Techniques for preparation of the terpolymers include solution, bulk, emulsion and suspension polymerization. Initiators include all the initiators used for free radical polymerization such as organic peroxides, hydroperoxides, azo or diazo compounds, persulfates, redox systems, etc. Emulsifiers include anionic, cationic, nonionic, or amphoteric. Modifiers include aliphatic, aryl mercaptans and disulfides, $CCl_4$, $CBr_4$, $CHI_3$ and $CHCl_3$, etc. Among these, mercaptans are the preferred ones. Crosslinkers include divinyl benzene, triallyl cyanurate and ethylene glycol dimethacrylate, etc.

Polymerization may be carried out in the presence of air, but faster reactions are observed in the absence of oxygen at temperatures ranging from $-30°$ C. to $110°$ C., although preferred temperatures range from about $5°$ C. to about $80°$ C.

The acrylic terpolymers useful in this invention can be made by emulsion polymerization of a mixture of monomers A, B and C in desired percentages in a suitable reactor, viz. an 8-ounce bottle or stirred reactor. Normally all monomers and initiators are charged to reactors, flushed with nitrogen and then reacted at $50°$ C. to about 32 percent solids in about 24 hours. For instance, a 100 parts of a monomeric mixture of the desired mixture of monomers A, B and C, together with 0.25 parts per hundred monomer (phm) potassium persulfate, 0.15 phm of tertiary dodecyl mercaptan, 0.3 phm of divinyl benzene (DVB), 2.0 phm sodium lauryl sulfate and 200 phm of distilled water. The reactor was cooled to room temperature and the terpolymer recovered by coagulation in 1.5 percent warm aqueous magnesium sulfate solution, water washed and dried at $50°$ C. overnight. Terpolymers consisting of 40/30/30 — 2 EHA/AN/PCMA, 40/30/30 — 2 EHA/AN/TBMA, 20/30/50 — 2 EHA/AN/VDC or 30/30/40 — 2 EHA/AN/VDC were made by the above recipe for use in the following examples wherein all parts and percentages are by weight unless otherwise designated. They have good fire retardancy and good tensile strength and elongation and further exhibit good retention of physical properties after 300 hours Accelerometer aging when incorporated with a phosphate plasticizer alone or in combination with complementary additives in 10 to 20 parts of decabromodiphenyl oxide or tris(beta-chloroethyl) phosphate, or in combination with antimony oxide and zinc oxide. See Tables 1 and 2 for illustration of this practice.

Those skilled in the art know that various ingredients such as lubricants, stabilizers, pigments, toners, surfactants, ultraviolet absorbers, antioxidants, can be added to the film depending upon the intended use and nature thereof.

Tables 1 and 2 show compositions in accordance with the invention where compounded on a mill on a parts by weight basis using the recipes of Table 1, which was formed into a film of the thickness shown in Table 2 before determining the physical properties of the films shown in Table 2.

TABLE 1

COMPOUNDING RECIPES AND FLAME TEST RESULTS

| Sample No. | 1A | 1B | 2A | 2B | 2C | 3A | 3B | 3C | 4A | 4B | 4C | 4D | 4E | 4F | 4G |
|---|---|---|---|---|---|---|---|---|---|---|---|---|---|---|---|
| Resin | 100 | → | → | → | → | → | → | → | → | → | → | → | → | → | → |
| W-618 | 1.5 | → | → | → | → | → | → | → | → | → | → | → | → | → | → |
| F-837 | 1.5 | → | → | → | → | → | → | → | → | → | → | → | → | → | → |
| TAP | 20 | → | → | → | — | — | — | — | 20 | 12.5 | 12.5 | 20 | → | → | → |
| IDDPP | — | — | — | — | — | 30 | → | → | — | — | — | — | — | — | — |
| TBCEP | — | — | 15 | 15 | — | — | — | — | — | — | — | — | — | — | — |
| DBDPO | 15 | 15 | — | — | 17.5 | — | — | — | — | — | — | — | — | — | — |
| Antimony oxide | — | — | — | — | — | — | — | — | 7.5 | 7.5 | 7.5 | 5.0 | 7.5 | 7.5 | 7.5 |
| Zinc oxide | — | — | — | — | — | — | — | — | 7.5 | 5.0 | 2.5 | 5.0 | 2.5 | 4.5 | 7.5 |
| A.O. 45 | — | 0.4 | — | 0.4 | 0.4 | — | — | — | — | — | — | — | — | — | — |
| A.O. 26 | — | — | — | — | — | 0.4 | — | — | 0.4 | → | → | → | → | → | → |
| A.O. 35 | — | — | — | — | — | — | 0.4 | — | — | — | — | — | — | — | — |
| A.O. 246 | — | — | — | — | — | — | — | 0.4 | — | — | — | — | — | — | — |
| Tinuvin P | — | 1.0 | — | 1.0 | → | → | → | → | → | → | → | → | → | → | → |
| Film Appearance | O | O | T | T | O | T | T | T | O | → | → | → | → | → | → |
| Burn Test (NFPA 701) | SE | → | → | → | → | → | → | → | → | → | → | → | → | → | → |

Note: 1. Sample No. 1A & 1B = 40/30/30-2EHA/AN/PCMA; No. 2A, 2B, & 2C = 40/30/30-2EHA/AN/TBMA; No. 3A, 3B, & 3C = 20/30/50-2EHA/AN/VDC; No. 4A-4G = 30/30/40-2EHA/AN/VDC.
Note: 2. O = Opaque; T = Transparent; SE = Self-existinguishing.

Table 2

Physical Properties of Accelerometer Aged Films*

| Sample No. | Time exposure, hr | Modulus psi at 100% | Tensile Strength, psi | Ultimate Elongation, % |
|---|---|---|---|---|
| 1A | 0 | 1280 | 2290 | 280 |
| 1A | 100 | 1560 | 1620 | 140 |
| 1A | 200 | 1620 | 1590 | 120 |
| 1A | 300 | 1640 | 1640 | 130 |
| 1B | 0 | 1090 | 1710 | 240 |
| 1B | 100 | 1230 | 1790 | 290 |
| 1B | 200 | 1320 | 1550 | 180 |
| 1B | 300 | 1310 | 1870 | 260 |
| 2A | 0 | 250 | 1330 | 370 |
| 2A | 100 | 980 | 1740 | 260 |
| 2B | 0 | 220 | 1270 | 360 |
| 2B | 100 | 1210 | 1740 | 240 |
| 2C | 0 | 980 | 1900 | 270 |
| 2C | 100 | 1220 | 2120 | 310 |
| 2C | 200 | 1410 | 1780 | 190 |
| 2C | 300 | 1430 | 2200 | 240 |
| 3A | 0 | 1880 | 2840 | 190 |
| 3A | 100 | 2100 | 3120 | 200 |
| 3A | 200 | 2220 | 3050 | 180 |
| 3A | 300 | 2030 | 2680 | 170 |
| 3B | 0 | 1840 | 2740 | 200 |
| 3B | 100 | 2280 | 3140 | 210 |
| 3B | 200 | 2370 | 3300 | 190 |
| 3B | 300 | 2320 | 3030 | 190 |
| 4A | 0 | 1170 | 2180 | 220 |
| 4A | 100 | 1470 | 2860 | 240 |
| 4A | 200 | 1490 | 2740 | 260 |
| 4A | 300 | 1520 | 2400 | 220 |
| 4B | 0 | 1410 | 1740 | 160 |
| 4B | 100 | 2030 | 2230 | 150 |
| 4B | 200 | 2010 | 2390 | 160 |
| 4B | 300 | 2100 | 2240 | 110 |
| 4C | 0 | 1590 | 2670 | 230 |
| 4C | 100 | 1980 | 3060 | 230 |
| 4C | 200 | 1980 | 2990 | 230 |
| 4C | 300 | 2050 | 2820 | 210 |
| 4D | 0 | 1120 | 2190 | 230 |
| 4D | 100 | 1320 | 2620 | 260 |
| 4D | 200 | 1500 | 2650 | 240 |
| 4D | 300 | 1480 | 2790 | 250 |
| 4E | 0 | 1190 | 2610 | 240 |
| 4E | 100 | 1400 | 2710 | 240 |
| 4E | 200 | 1450 | 2870 | 260 |
| 4E | 300 | 1420 | 2590 | 240 |
| 4F | 0 | 1080 | 2000 | 230 |
| 4F | 100 | 1400 | 2670 | 240 |
| 4F | 200 | 1420 | 2850 | 260 |
| 4F | 300 | 1530 | 2240 | 210 |
| 4G | 0 | 1040 | 2030 | 200 |
| 4G | 100 | 1370 | 1580 | 140 |
| 4G | 200 | 1370 | 1860 | 180 |
| 4G | 300 | 1470 | 2120 | 200 |

*Polymer film thickness = 14–26 mils.

While certain representative embodiments and details have been shown for the purpose of illustrating the invention, it will be apparent to those skilled in this art that various changes and modifications may be made therein without departing from the spirit or scope of the invention.

What is claimed is:

1. A flame retardant polymer film comprising a terpolymer and a fire retardant plasticizer, said terpolymer being a reaction product of (1) 20–60 weight percent 2-ethylhexyl acrylate, (2) 10 to 40 weight percent acrylonitrile, and (3) 20 to 70 weight percent halogenated monomer selected from the class consisting of vinylidene chloride, halogenated phenyl acrylate, halogenated phenyl methacrylate and the fire retardant plasticizer being selected from the class consisting of a triorgano phosphate, alone or in combination with decabromodiphenyl oxide and metal oxides of antimony and zinc.

2. The film of claim 1 wherein the terpolymer is an addition of 2-ethylhexyl acrylate, acrylonitrile and a third monomer selected from the class consisting of vinylidene chloride, pentachlorophenyl methacrylate and 2,4,6-tribromophenyl methacrylate.

3. The film of claim 1 wherein the fire retardant plasticizer is present in about 10 to 40 parts per 100 parts of polymer.

4. The film of claim 1 wherein the fire retardant additive contains a triorgano phosphate in combination with at least one complementary additive selected from the class of decabromodiphenyl oxide, antimony oxide and zinc oxide.

* * * * *